United States Patent
Mealey et al.

(10) Patent No.: US 6,304,951 B1
(45) Date of Patent: Oct. 16, 2001

(54) DATA PROCESSING SYSTEM AND METHOD FOR GENERATING VIRTUAL MEMORY DESCRIPTORS INCLUDING PRETRANSLATED PHYSICAL ADDRESSES

(75) Inventors: Bruce Gerard Mealey, Austin; Randal Craig Swanberg, Round Rock, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/165,174

(22) Filed: Oct. 1, 1998

(51) Int. Cl.[7] ....................................... G06F 12/08
(52) U.S. Cl. .................. 711/206; 711/202; 711/203; 711/205; 711/207; 711/208
(58) Field of Search .................................... 711/202, 203, 711/205, 206, 207, 208

(56) References Cited

U.S. PATENT DOCUMENTS

| | | | |
|---|---|---|---|
| 4,654,790 | * | 3/1987 | Woffinden .............................. 364/200 |
| 4,774,659 | * | 9/1988 | Smith et al. .......................... 364/200 |
| 4,890,223 | | 12/1989 | Cruess et al. . |
| 5,133,060 | | 7/1992 | Weber et al. . |
| 5,960,466 | * | 9/1999 | Belgard ................................ 711/213 |
| 6,049,857 | * | 4/2000 | Watkins ............................... 711/207 |

* cited by examiner

*Primary Examiner*—Matthew Kim
*Assistant Examiner*—Pierre M. Vital
(74) *Attorney, Agent, or Firm*—Leslie A. Van Leeuwen; Bracewell & Patterson, L.L.P.

(57) ABSTRACT

A data processing system and method are described for generating virtual memory descriptors which include pretranslated physical addresses. The data processing system has a virtual memory address space and a main memory. The main memory includes a first plurality of physical addresses. A temporary association is established between a region of the main memory and a segment of the virtual memory address space. The region of main memory is addressed utilizing a second plurality of physical addresses. The segment of virtual memory is addressed utilizing a plurality of virtual addresses. In response to the establishment of the temporary association, a virtual memory descriptor is generated and is utilized to address the segment. Each of the plurality of virtual addresses is translated to one of the second plurality of physical addresses. Each translated one of the second plurality of physical addresses is stored in the memory descriptor. The plurality of virtual addresses are translated to the second plurality of physical addresses and stored prior to the virtual memory descriptor being utilized to access the main memory.

16 Claims, 5 Drawing Sheets

DATA PROCESSING SYSTEM AND METHOD FOR GENERATING VIRTUAL MEMORY DESCRIPTORS INCLUDING PRETRANSLATED PHYSICAL ADDRESSES

BACKGROUND OF THE INVENTION

1. Field of the Invention

The present invention relates in general to data processing systems and, in particular, to a data processing system having a virtual memory address space for generating virtual memory descriptors which are utilized to efficiently access a main memory. Still more particularly, the present invention relates to a method and system in a data processing system having a virtual memory address space for generating virtual memory descriptors including pretranslated physical addresses for accessing a main memory.

2. Description of the Related Art

Personal computer systems are well known in the art. They have attained widespread use for providing computer power to many segments of today's modern society. Personal computers may be defined as desktop systems, floor standing systems, or portable microcomputers. Examples of such personal computer systems are IBM's PC series, Aptiva series, and Thinkpad series.

Many computer systems include a virtual memory address space which permits an application or process to address a space which is larger than the main memory included within the system. In virtual memory systems, it is necessary to translate virtual addresses into physical addresses in order to execute commands. One common method for performing the translations is to perform a page table look-up.

The virtual address space is typically divided into equal sized pages. A page table is maintained which includes a physical address for the first byte of main memory for each page of the virtual address space. The page table is stored in main memory and is accessed each time a virtual address is included within a command. In this manner, each time a virtual address is encountered, the physical address must be determined.

The physical address is determined utilizing a page table typically by taking a number of the upper bits of the virtual address to determine an associated page of virtual memory. The lower ordered bits are utilized as an offset into the page to locate the starting physical address for the particular virtual address. Therefore, for each virtual address, the page table must be accessed to determine the starting physical address for the associated page. Thereafter, the starting physical address must be added to the offset to determine the physical address which is associated with the virtual address of interest.

Some virtual memory systems utilize a descriptor-based addressing scheme. In these systems, each command which needs to access a virtual memory address must utilize a memory descriptor to do so. The memory descriptor includes information which tells the virtual memory manager of the system how to address the location in a virtual sense. Typically, the descriptor will include a segment identifier which identifies a particular virtual memory segment.

Once the memory descriptor is utilized to obtain the necessary virtual memory addressing information, the virtual address must be translated to a physical address for each command.

For example, a system may often need to perform several input/output commands. These commands may be implemented utilizing direct memory access (DMA) commands. When a DMA command is executed, the virtual address included within the command must be translated into the appropriate physical address. This process of translating addresses must be performed for each command.

In some systems, the timing of the execution of commands is critical. For example, multimedia systems require the delivery of data within a deadline in order to maintain an accurate audio and/or video output. The process of translating virtual addresses into physical addresses for each I/O command will degrade the performance of the system.

Therefore a need exists for a method and system in a data processing system having a virtual memory address space for generating a virtual memory descriptor including pretranslated physical addresses utilized to access a main memory.

SUMMARY OF THE INVENTION

It is therefore one object of the present invention to provide an improved data processing system.

It is another object of the present invention to provide a method and system in a data processing system having a virtual memory address space for generating virtual memory descriptors which are utilized to efficiently access a main memory.

It is yet another object of the present invention to provide a method and system in a data processing system having a virtual memory address space for generating virtual memory descriptors including pretranslated physical addresses for accessing a main memory.

The foregoing objects are achieved as is now described. A data processing system and method are described for generating virtual memory descriptors which include pretranslated physical addresses. The data processing system has a virtual memory address space and a main memory. The main memory includes a first plurality of physical addresses. A temporary association is established between a region of the main memory and a segment of the virtual memory address space. The region of main memory is addressed utilizing a second plurality of physical addresses. The segment of virtual memory is addressed utilizing a plurality of virtual addresses. In response to the establishment of the temporary association, a virtual memory descriptor is generated and is utilized to address the segment. Each of the plurality of virtual addresses is translated to one of the second plurality of physical addresses. Each translated one of the second plurality of physical addresses is stored in the memory descriptor. The plurality of virtual addresses are translated to the second plurality of physical addresses and stored prior to the virtual memory descriptor being utilized to access the main memory.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–6 of the drawings, like numerals being used for like and corresponding parts of the accompanying drawings.

A method and system in a data processing system having a virtual memory address space are described for generating virtual memory descriptors utilized to efficiently access a main memory included within the system.

Commands executing within the system utilize virtual addresses to address memory. These virtual addresses must be translated into physical addresses before the commands are able to complete executing. The present invention eliminates the need to translate the virtual addresses into physical addresses during the execution of each command.

A virtual memory descriptor is generated when a region of main memory is pinned for use as the physical location of a segment of the virtual memory address space. Memory is pinned when the particular addresses must remain resident in the main memory. For example, memory may be pinned for I/O operations so that the mapping is not changed during the operations. When the I/O is complete, the memory may be unpinned.

The physical addresses which are associated with the virtual addresses included within the segment are translated, or calculated, in response to the pinning of the region of main memory. These pretranslated physical addresses are stored within the memory descriptor.

When a command includes a virtual address, a memory descriptor associated with a virtual memory segment which includes the virtual address is utilized. The memory descriptor includes the complete, pretranslated physical address which is associated with this virtual address. In this manner, the system does not need to calculate the physical address.

Each command which includes this virtual address will be able to utilize the memory descriptor to obtain the associated physical address. Therefore, it is not necessary to calculate the physical address prior to executing each command.

Figure 1:
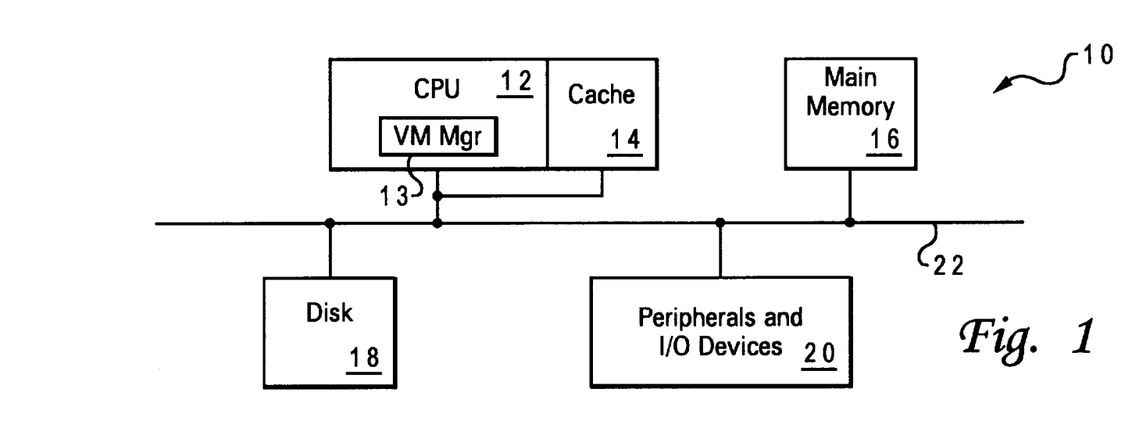
FIG. 1 illustrates a pictorial representation of a data processing system which may be utilized to implement the method and system of the present invention.

FIG. 1 illustrates a pictorial representation of a data processing system which may be utilized to implement the method and system of the present invention. Data processing system 10 may be implemented utilizing any type of computer system, such as a personal computer, mini computer, or mainframe computer, suitably programmed to execute the methods and processes described below. Data processing system 10 includes a central processing unit 12 having a virtual memory manager 13 and an associated cache 14, a main memory 16, a disk 18, and other peripherals and/or input/output (I/O) devices 20 coupled together utilizing a bus 22. Devices 20 may include printers, plotters, a mouse, a joy stick, and/or other disks. Those skilled in the art will recognize that multiple data processing systems such as system 10 may be coupled together. In addition, data processing system 10 may include multiple processors.

Figure 2:
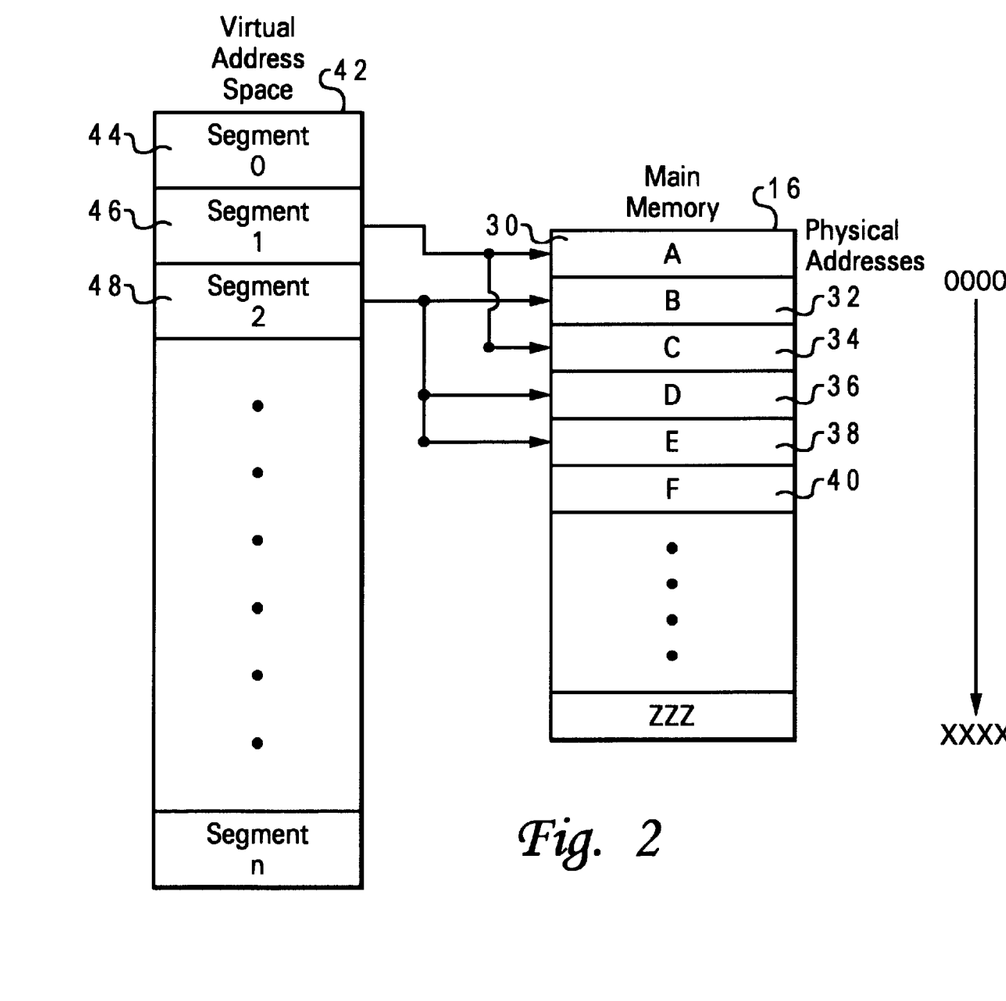
FIG. 2 depicts a pictorial representation of a main memory including a plurality of storage locations which are addressed utilizing a plurality of physical addresses, and a virtual address space which may be utilized by an application to address the main memory in accordance with the method and system of the present invention.

FIG. 2 depicts a pictorial representation of a main memory including a plurality of storage locations which are addressed utilizing a plurality of physical addresses, and a virtual address space which may be utilized by an application to address the main memory in accordance with the method and system of the present invention. Data processing system 10 includes a virtual memory manager for permitting a user to address a virtual address space which is much larger than the number of storage locations included within main memory 16. In a preferred embodiment, data processing system 10 includes a descriptor-based memory addressing scheme.

In a descriptor-based memory addressing scheme, each process or command executed within system 10 utilizes a descriptor to address all components included within system 10. Components may include a main memory location, a group of several main memory location, a disk location, a group of several disk locations, a subroutine, or any other type of data or program component which could be included within system 10. The descriptor describes to the virtual memory manager how to address a particular component in a virtual sense. The descriptor provides a virtual memory address for the particular component.

Main memory 16 includes a plurality of storage locations 30–40. A different physical address is utilized to address a particular storage location. For example, location 30 is addressed utilizing physical address "0000".

A virtual memory address space 42 is included within system 10. Virtual memory address space 42 is divided into a plurality of segments 44–48. The segments need not be a fixed size, and may include a collection of pages of virtual memory. Each segment will include a plurality of different virtual memory addresses. At any given time, each segment resides either in main memory 16 or within disk 18.

A region of main memory may be "pinned" by temporarily associating the region with a portion of the virtual memory address space. When a region of main memory is temporarily associated with a portion of the virtual memory, the region may be used only as the physical storage locations for the portion of the virtual memory. The portion of the virtual memory may include any size of the virtual memory. It may include one or more segments of virtual memory. When the temporary association between the region of main memory and the portion of virtual memory is removed, i.e. the region is unpinned, the region may again be used for any purpose.

In FIG. 2, a region of main memory 16 has been temporarily associated with segment 46 of the virtual memory. Segment 46 is temporarily associated with physical addresses 30 and 34. A region of main memory will often include discontiguous main memory storage locations. In addition, a second region of main memory 16 has been temporarily associated with segment 48. Segment 48 is temporarily associated with physical addresses 32, 36, and 38. Segment 44 is not temporarily associated with any region of main memory 16.

As each region of main memory 16 is pinned, a memory descriptor is generated. The memory descriptor includes information which indicates to the virtual memory manager how to address the region in a virtual sense. Therefore, each region will have an associated descriptor which includes a segment identifier (ID) of the virtual memory address space associated with the pinned region. The descriptor is associated with both the pinned region and the virtual memory segment for which it was pinned.

Figure 3:
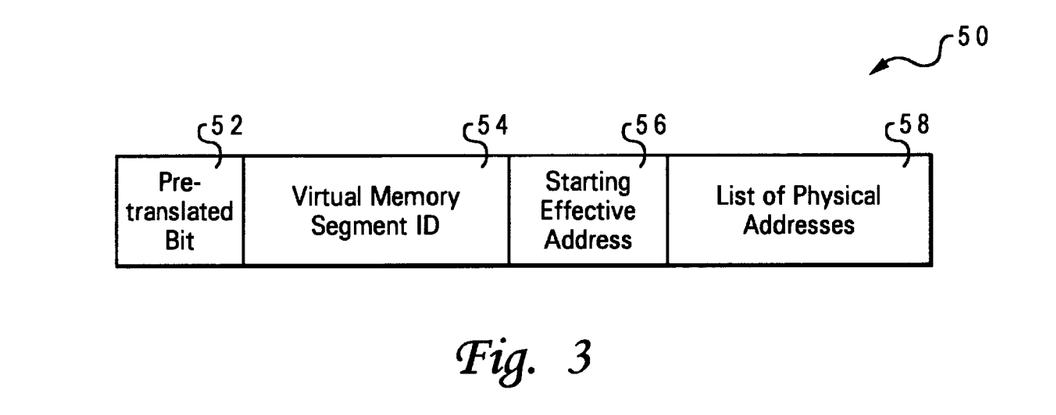
FIG. 3 illustrates a pictorial representation of a plurality of fields included within a memory descriptor in accordance with the method and system of the present invention.

FIG. 3 illustrates a pictorial representation of a plurality of fields included within a memory descriptor in accordance with the method and system of the present invention. Memory descriptor 50 includes fields 52, 54, 56, and 58. Field 52 is utilized to store a pretranslation bit. If memory descriptor 50 includes the pretranslated physical addresses associated with the portion of the virtual memory associated with the descriptor, the bit stored in field 52 is set. Otherwise, the bit is reset. Field 54 is utilized to store a virtual memory segment ID. An identifier of the portion of the virtual memory associated with descriptor 50 is stored in field 54. Field 56 includes the starting virtual address associated with this segment of the virtual memory. Field 58 is utilized to store a list of the physical storage locations in main memory 16 which are included within the region associated with descriptor 50.

For example, a descriptor is generated when a region of main memory is pinned for segment 46. The pinned region of main memory includes storage locations 30 and 34. In this descriptor, bit 52 is set. The segment ID is included in field 54 identifying segment 46. Field 56 includes the starting virtual address associated with segment 46. And, the physical addresses of storage locations 30 and 34 are listed and included within field 58.

Figure 4:
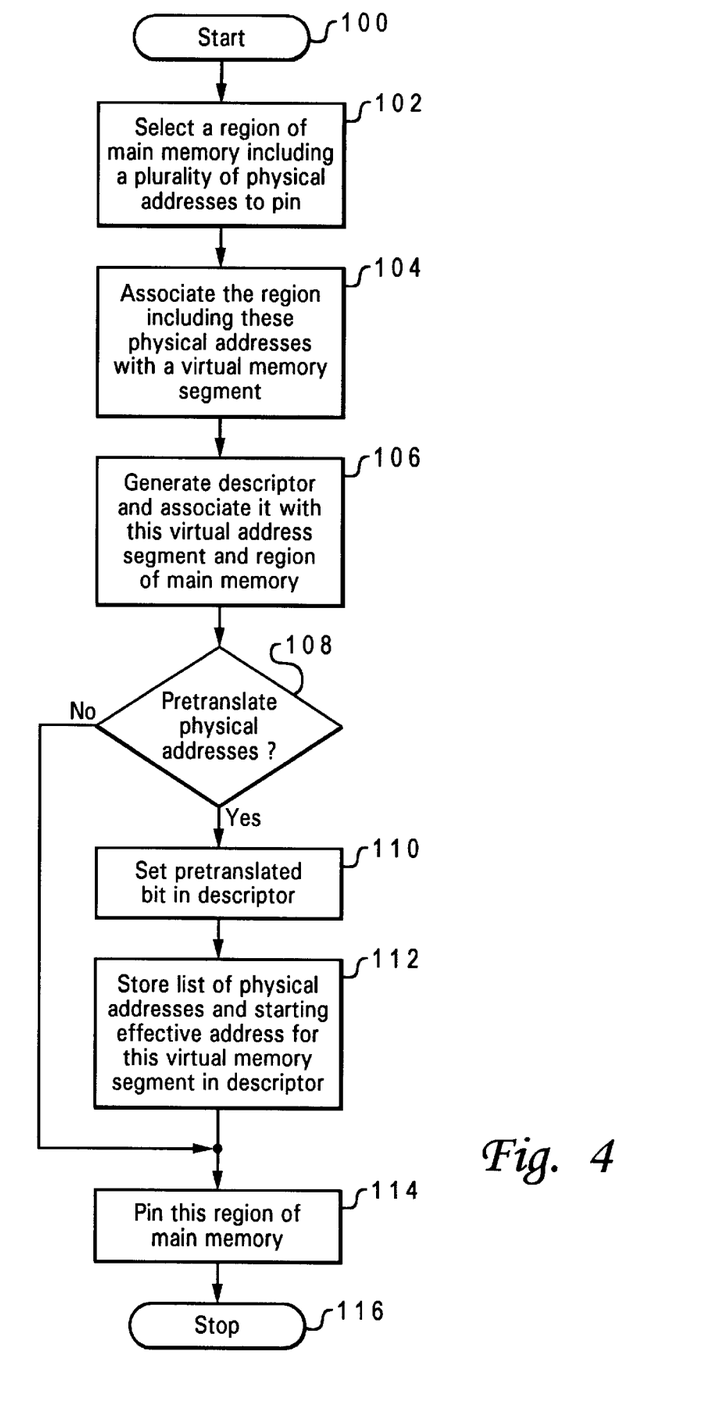
FIG. 4 depicts a high level flow chart which illustrates the temporary association of a region of main memory with a portion of virtual memory, and, in response, the generation of a memory descriptor including pretranslated physical addresses of the region of main memory in accordance with the method and system of the present invention.

FIG. 4 depicts a high level flow chart which illustrates the temporary association of a region of main memory with a portion of virtual memory, and, in response, the generation of a memory descriptor including pretranslated physical addresses of the region of main memory in accordance with the method and system of the present invention. The process starts as depicted by block 100 and thereafter passes to block 102 which illustrates a selection of a region of main memory including a plurality of physical addresses to pin. Pinning a region of main memory for use as the physical location of a portion of virtual memory temporarily associates the region of main memory with the portion of virtual memory. While the region is pinned, it may not be used for a purpose other than as the physical location of the portion of virtual memory.

While the region of main memory is pinned, the region of main memory is temporarily associated with the segment of virtual memory for which it was pinned. When the region is no longer pinned, the association between main memory and virtual memory no longer exists.

Next, block 104 depicts the association of the region including the physical addresses with the portion of virtual memory. Typically, the portion of virtual memory will be a segment of virtual memory. The process passes to block 106 which illustrates the generation of a memory descriptor and the association of the descriptor with the virtual memory segment and the region of main memory. Block 108 then depicts a determination of whether the descriptor will include pretranslated physical addresses. If a determination is made that the descriptor will not include pretranslated physical addresses, the process passes to block 114. Referring again to block 108, if a determination is made that the descriptor will include pretranslated physical addresses, the process passes to block 110.

Block 110 illustrates the setting of the pretranslation bit 52 in the descriptor. Next, block 112 depicts the storage of the starting virtual address (i.e. the starting effective address) for this virtual memory segment and a list of the physical addresses pinned, i.e. temporarily associated with this virtual memory segment, in the descriptor. Thereafter, block 114 illustrates the pinning of this region of main memory. The process terminates as depicted by block 116.

Figure 5:
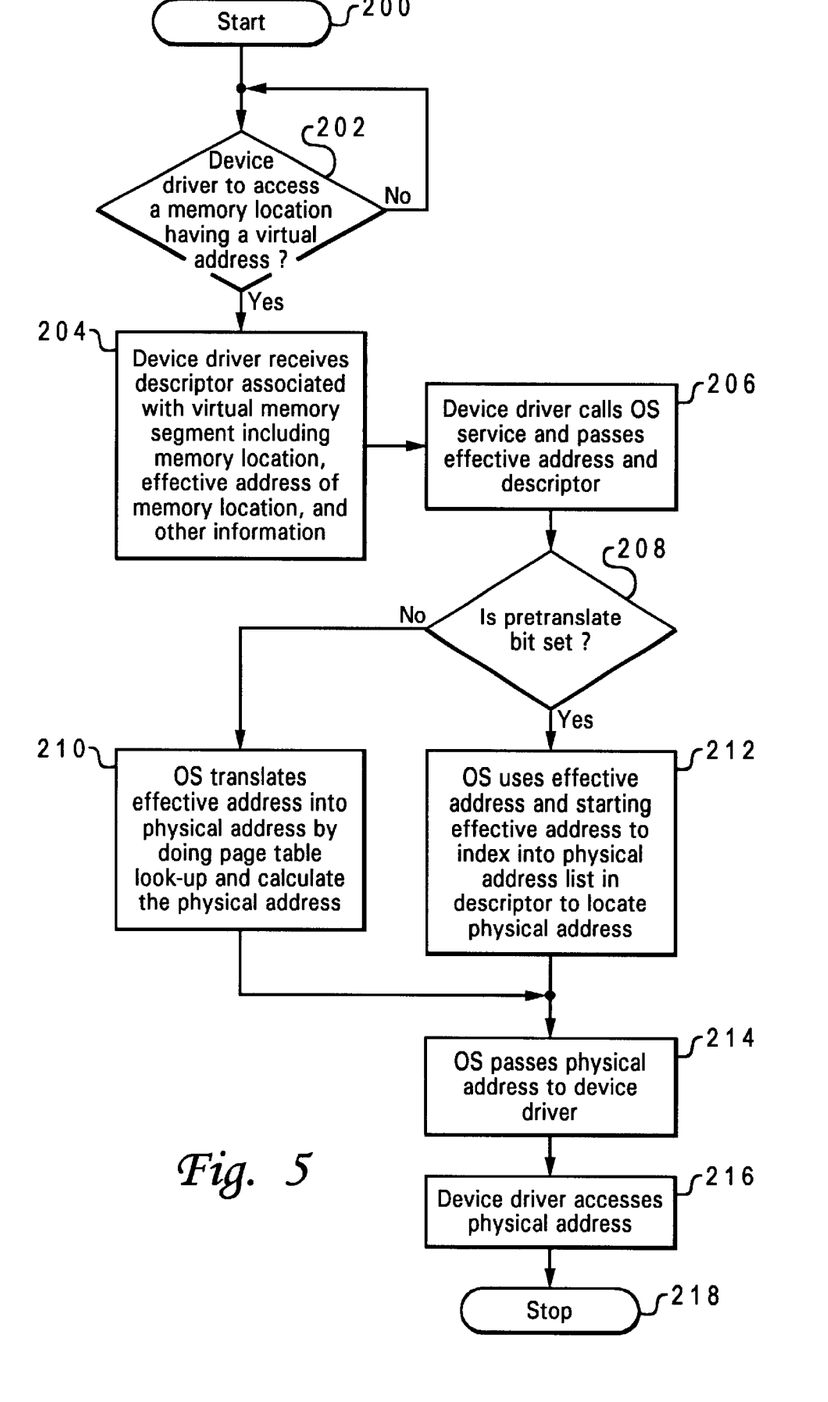
FIG. 5 illustrates a high level flow chart which depicts a utilization of a memory descriptor including pretranslated physical addresses of a region of main memory in accordance with the method and system of the present invention.

FIG. 5 illustrates a high level flow chart which depicts a utilization of a memory descriptor including pretranslated physical addresses of a region of main memory in accordance with the method and system of the present invention. The process starts as depicted by block 200 and thereafter passes to block 202 which illustrates a determination of whether or not a device driver is attempting to access a memory location in the virtual memory address space. If a determination is made that a device driver is not attempting to access a memory location in the virtual memory address space, the process passes back to block 202. If a determination is made that a device driver is attempting to access a memory location in the virtual memory address space, the process passes to block 204 which depicts the device driver receiving a descriptor which is associated with the virtual memory segment which includes the memory location the device driver is attempting to access. The device driver also receives the virtual address of that memory location, as well as other information.

Next, block 206 illustrates the device driver passing the descriptor and the virtual address of the memory location to the operating system (OS). Thereafter, block 208 depicts a determination of whether or not the pretranslation bit associated with this descriptor is set. If a determination is made that the pretranslation bit is reset, the process passes to block 210 which depicts the operating system translating the virtual address into a physical address by performing a page table look-up and calculating the physical address. The process then passes to block 214.

Referring again to block 208, if a determination is made that the pretranslation bit is set, the process passes to block 212 which depicts the operating system using the virtual address and starting virtual address to determine an index into the list of physical addresses included within the descriptor to locate the physical address.

Thereafter, block 214 illustrates the operating system passing the physical address to the device driver. Block 216 then depicts the device driver accessing the physical address. The process then terminates as illustrated by block 218.

Figure 6:
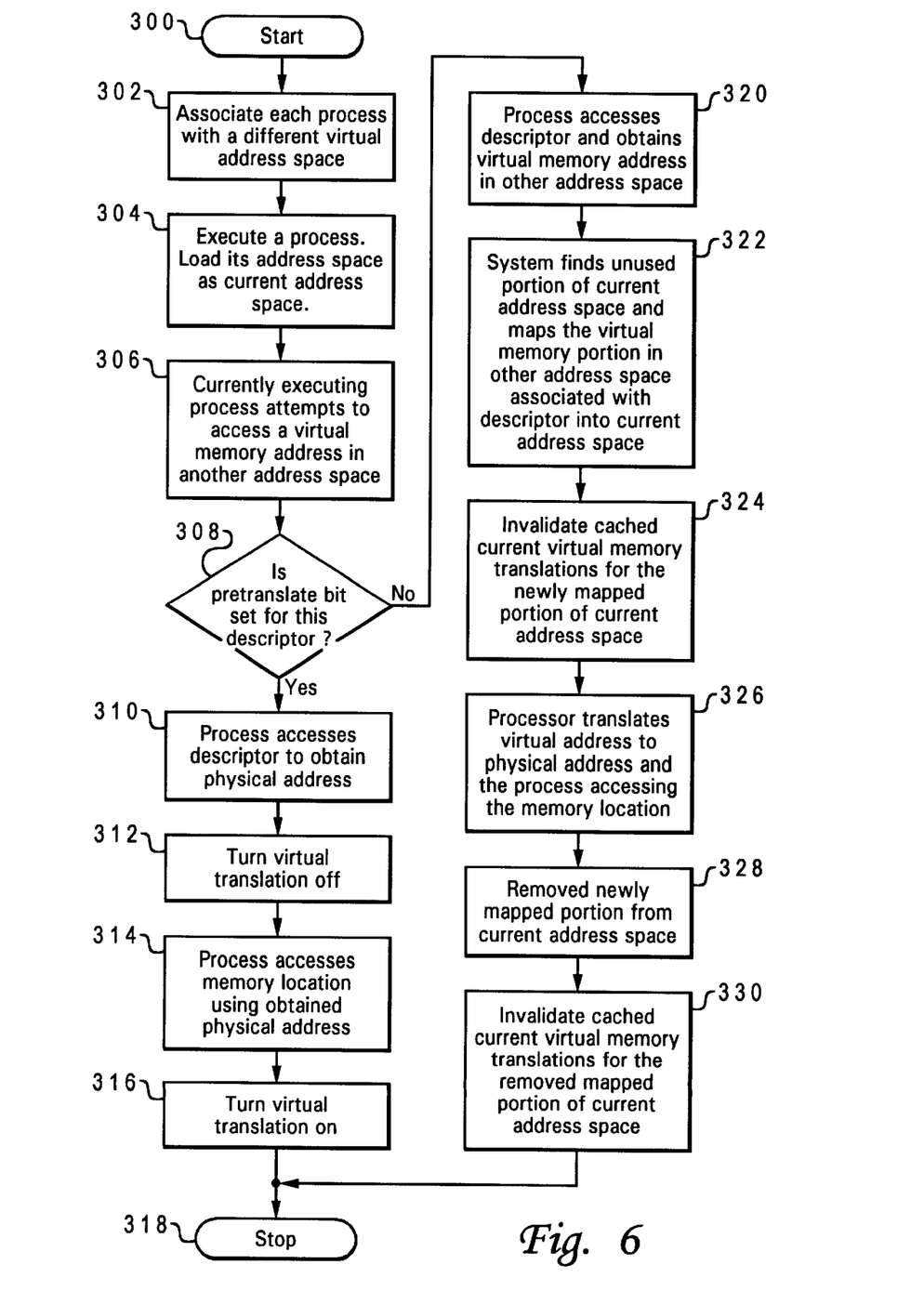
FIG. 6 depicts a high level flow chart which illustrates a process associated with a first virtual memory address space accessing a main memory location mapped into a second virtual memory address space utilizing pretranslated physical addresses in accordance with the method and system of the present invention.

FIG. 6 depicts a high level flow chart which illustrates a process associated with a first virtual memory address space accessing a main memory location mapped into a second virtual memory address space utilizing pretranslated physical addresses in accordance with the method and system of the present invention. The process starts as depicted by block 300 and passes to block 302 which illustrates an association of each of a plurality of processes with a different virtual memory address space. Next, block 304 depicts the execution of one of the plurality of processes. The address space associated with the executing process is loaded and is the current address space. Thereafter, block 306 illustrates the process attempting to access a virtual memory address which is mapped into an address which is different from the current address space.

Block 308, then, depicts a determination of whether or not the pretranslation bit is set associated with the memory descriptor associated with the virtual memory address the process is attempting to access. If a determination is made that the pretranslation bit is set, the process passes to block 310 which illustrates the process assessing this descriptor to obtain the pretranslated physical address. Next, block 312 depicts virtual translation being turned off. The process then passes to block 314 which illustrates the process accessing the memory location utilizing the pretranslated physical address obtained from the descriptor. Thereafter, block 316 depicts virtual translation being turned back on. The process then terminates as depicted by block 318.

Referring again to block 308, if a determination is made that the pretranslation bit is reset, the process passes to block 320. When the pretranslated bit is reset, the descriptor associated with this virtual memory address does not include pretranslated physical addresses. Therefore, the descriptor will include only information which tells the virtual memory manager how to address this virtual memory location in a virtual sense. Block 320 illustrates the process accessing the descriptor and obtaining the virtual memory address in the other address space. Next, block 322 depicts the system finding an unused portion of the current address space and mapping the virtual memory portion in the other address space associated with the descriptor into the current address space.

The process then passes to block 324 which illustrates the invalidation of the cached current virtual memory translations for the newly mapped portion of the current address space. Thereafter, block 326 depicts the processor translating the virtual address to a physical address and the process accessing the physical address. Block 328, then illustrates the removal of the newly mapped portion from the current address space. Next, block 330 depicts the invalidation of the cached current virtual memory translations for the removed mapped portion of the current address space. The process terminates as illustrated by block 318.

While a preferred embodiment has been particularly shown and described, it will be understood by those skilled in the art that various changes in form and detail may be made therein without departing from the spirit and scope of the present invention.

What is claimed is:

1. A method in a data processing system having a virtual memory address space for utilizing virtual memory descriptors to efficiently access a main memory included within said data processing system, said main memory addressed utilizing a first plurality of physical addresses, said method comprising the steps of:

establishing a temporary association between a region of said main memory addressed utilizing a second plurality of physical addresses and a segment of said virtual memory address space addressed utilizing a plurality of virtual addresses;

in response to said establishment of said temporary association, generating a virtual memory descriptor for said segment, said virtual memory descriptor being utilized to virtually address said segment;

translating each of said plurality of virtual addresses to one of said second plurality of physical addresses;

storing said translated one of said second plurality of physical addresses for each of said plurality of virtual addresses in said virtual memory descriptor, said plurality of virtual addresses being translated to said second plurality of physical addresses and stored prior to said virtual memory descriptor being utilized to access said main memory;

in response to said translating and storing steps, setting a pretranslated bit within said virtual memory descriptor, wherein said pretranslated bit indicates that said virtual memory descriptor includes physical address translations of said virtual addresses;

executing one of a plurality of commands which accesses one of said plurality of virtual addresses utilizing said memory descriptor, wherein said one of said plurality of virtual addresses corresponds to one of said second plurality of physical addresses; and during said execution:

determining whether or not said pretranslated bit is set; and in response to determining that said pretranslated bit is set, utilizing said memory descriptor to locate said one of said second plurality of physical addresses that corresponds to said accessed virtual address.

2. The method according to claim 1, further comprising the step of associating each of said plurality of virtual addresess with a different one of said second plurality of physical addresses.

3. The method according to claim 2, wherein said first plurality of physical addresses for addressing said main memory includes only discontiguous physical addresses.

4. The method according to claim 3, wherein said step of establishing a temporary association between said region of main memory and said segment of said virtual memory address space further includes the step of pinning said region of main memory.

5. The method according to claim 4, further comprising the steps of:

said system simultaneously executing a plurality of processes; and associating each of said plurality of processes with a different virtual address space.

6. The method according to claim 5, further comprising the steps of:

associating a first of said plurality of processes with a first virtual memory address space and associating a second of said plurality of processes with a second virtual memory address space, wherein said first virtual address space is different from said second virtual address space;

said first of said plurality of processes attempting to access one of said plurality of virtual memory addresses, said one of said plurality of virtual memory addresses being included within said second virtual address space; and said first of said plurality of processes utilizing said memory descriptor to obtain a translated one of said second plurality of physical addresses for said one of said plurality of virtual addresses, wherein said obtained pretranslated one of said second plurality of physical addresses is utilized by said first of said plurality of processes to access said one of said plurality of virtual memory addresses.

7. The method according to claim 1, further comprising a step of in response to determining that said pretranslated bit is not set, performing a page table lookup to calculate said one of said second plurality of physical addresses that corresponds to said accessed virtual address.

8. A data processing system having a virtual memory address space for utilizing virtual memory descriptors to efficiently access a main memory included within said data processing system, said main memory addressed utilizing a first plurality of physical addresses, comprising:

means for establishing a temporary association between a region of said main memory addressed utilizing a second plurality of physical addresses and a segment of said virtual memory address space addressed utilizing a plurality of virtual addresses;

means responsive to said establishment of said temporary association, for generating a virtual memory descriptor for said segment, said virtual memory descriptor being utilized to virtually address said segment;

means for translating each of said plurality of virtual addresses to one of said second plurality of physical addresses;

means for storing said translated one of said second plurality of physical addresses for each of said plurality of virtual addresses in said virtual memory descriptor, said plurality of virtual addresses being translated to said second plurality of physical addresses and stored prior to said virtual memory descriptor being utilized to access said main memory;

means, responsive to said plurality of virtual addresses being translated and stored, for setting a pretranslated bit within said virtual memory descriptor, wherein said pretranslated bit indicates that said virtual memory descriptor includes physical address translations of said virtual addresses;

means for executing one of a plurality of commands which accesses one of said plurality of virtual addresses utilizing said memory descriptor, wherein said one of said plurality of virtual addresses corresponds to one of said second plurality of physical addresses; and means for during said execution:
 determining whether or not said pretranslated bit is set; and
 in response to determining that said pretranslated bit is set, utilizing said memory descriptor to locate said one of said second plurality of physical addresses that corresponds to said accessed virtual address.

9. The system according to claim 8, further comprising means for associating each of said plurality of virtual addresses with a different one of said second plurality of physical addresses.

10. The system according to claim 9, wherein said first plurality of physical addresses for addressing said main memory includes only discontiguous physical addresses.

11. The system according to claim 10, wherein said means for establishing a temporary association between said region of main memory and said segment of said virtual memory address space further includes means for pinning said region of main memory.

12. The system according to claim 11, further comprising:
 means for said system simultaneously executing a plurality of processes; and
 means for associating each of said plurality of processes with a different virtual address space.

13. The system according to claim 12, further comprising:
 means for associating a first of said plurality of processes with a first virtual memory address space and associating a second of said plurality of processes with a second virtual memory address space, wherein said first virtual address space is different from said second virtual address space;

means for said first of said plurality of processes attempting to access one of said plurality of virtual memory addresses, said one of said plurality of virtual memory addresses being included within said second virtual address space; and means for said first of said plurality of processes utilizing said memory descriptor to obtain a translated one of said second plurality of physical addresses for said one of said plurality of virtual addresses, wherein said obtained pretranslated one of said second plurality of physical addresses is utilized by said first of said plurality of processes to access said one of said plurality of virtual memory addresses.

14. The system according to claim 8, further comprising means, responsive to a determination that said pretranslated bit is not set, for performing a page table lookup to calculate said one of said second plurality of physical addresses that corresponds to said accessed virtual address.

15. A method in a data processing system having a virtual memory address space for utilizing virtual memory descriptors to efficiently access a main memory included within said data processing system, said main memory addressed utilizing a first plurality ofphysical addresses, said method comprising the steps of:

establishing a temporary association between a region of said main memory addressed utilizing a second plurality of physical addresses and a segment of said virtual memory address space addressed utilizing a plurality of virtual addresses;

in response to said establishment of said temporary association, generating a virtual memory descriptor for said segment, said virtual memory descriptor being utilized to virtually address said segment;

translating each of said plurality of virtual addresses to one of said second plurality of physical addresses;

storing said translated one of said second plurality of physical addresses for each of said plurality of virtual addresses in said virtual memory descriptor, said plurality of virtual addresses being translated to said second plurality of physical addresses and stored prior to said virtual memory descriptor being utilized to access said main memory;

in response to said translating and storing steps, setting a pretranslated bit within said virtual memory descriptor, wherein said pretranslated bit indicates that said virtual memory descriptor includes physical address translations of said virtual addresses;

associating each of said plurality of virtual addresses with a different one of said second plurality of physical addresses;

wherein said first plurality of physical addresses for addressing said main memory includes only discontiguous physical addresses;

wherein said step of establishing a temporary association between said region of main memory and said segment of said virtual memory address space further includes the step of pinning said region of main memory;

executing one of a plurality of commands which accesses one of said plurality of virtual addresses utilizing said memory descriptor, wherein said one of said plurality of virtual addresses corresponds to one of said second plurality of physical addresses; and during said execution:
- determining whether or not said pretranslated bit is set; and
- in response to determining that said pretranslated bit is set, utilizing said memory descriptor to locate said one of said second plurality of physical addresses that corresponds to said accessed virtual address.

16. A data processing system having a virtual memory address space for utilizing virtual memory descriptors to efficiently access a main memory included within said data processing system, said main memory addressed utilizing a first plurality of physical addresses, comprising:

- means for establishing a temporary association between a region of said main memory addressed utilizing a second plurality of physical addresses and a segment of said virtual memory address space addressed utilizing a plurality of virtual addresses;
- means responsive to said establishment of said temporary association, for generating a virtual memory descriptor for said segment, said virtual memory descriptor being utilized to virtually address said segment;
- means for translating each of said plurality of virtual addresses to one of said second plurality of physical addresses;
- means for storing said translated one of said second plurality of physical addresses for each of said plurality of virtual addresses in said virtual memory descriptor, said plurality of virtual addresses being translated to said second plurality of physical addresses and stored prior to said virtual memory descriptor being utilized to access said main memory;
- in response to said translating and storing steps, setting a pretranslated bit within said virtual memory descriptor, wherein said pretranslated bit indicates that said virtual memory descriptor includes physical address translations of said virtual addresses;
- means for associating each of said plurality of virtual addresses with a different one of said second plurality of physical addresses;
- wherein said first plurality of physical addresses for addressing said main memory includes only discontiguous physical addresses;
- wherein said means for establishing a temporary association between said region of main memory and said segment of said virtual memory address space further includes means for pinning said region of main memory;
- means for executing one of a plurality of commands which accesses one of said plurality of virtual addresses utilizing said memory descriptor, wherein said one of said plurality of virtual addresses corresponds to one of said second plurality of physical addresses; and
- means for during said execution:
  - determining whether or not said pretranslated bit is set; and
  - in response to determining that said pretranslated bit is set, utilizing said memory descriptor to locate said one of said second plurality of physical addresses that corresponds to said accessed virtual address.

* * * * *